United States Patent
Novlan

(10) Patent No.: US 11,234,183 B2
(45) Date of Patent: Jan. 25, 2022

(54) FACILITATION OF CAPABILITY CONFIGURATION AND COORDINATION FOR INTEGRATED ACCESS AND BACKHAUL 5G OR OTHER NEXT GENERATION NETWORK

(71) Applicant: AT&T Intellectual Property I, L.P., Atlanta, GA (US)

(72) Inventor: Thomas Novlan, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 16/861,831

(22) Filed: Apr. 29, 2020

(65) Prior Publication Data
US 2021/0345225 A1 Nov. 4, 2021

(51) Int. Cl.
*H04W 48/08* (2009.01)
(52) U.S. Cl.
CPC .................. *H04W 48/08* (2013.01)
(58) Field of Classification Search
None
See application file for complete search history.

(56) References Cited

U.S. PATENT DOCUMENTS

2020/0145965 A1* 5/2020 Luo .................. H04W 72/0413
2021/0144705 A1* 5/2021 Li ..................... H04W 28/0215

OTHER PUBLICATIONS

AT&T, et al. "New SID Proposal: Study on Integrated Access and Backhaul for NR" 8881123GPP TSG RAN Meeting #75, Dubrovnik, Croatia, Mar. 6-9, 2017, RP-170821, 5 pages.

* cited by examiner

*Primary Examiner* — Hong S Cho
(74) *Attorney, Agent, or Firm* — Amin, Turocy & Watson, LLP

(57) ABSTRACT

In order to support integrated access and backhaul (IAB) network functionality, such as topology formation/adaptation, and access and backhaul link management, capability signaling can be configured and exchanged between the network, parent IAB nodes, and child IAB nodes. This can include messages related to IAB-node distributed unit (DU) function capabilities, IAB-node mobile termination (MT) function capabilities, joint IAB-node DU/MT capabilities, and internal IAB node and network capability management and coordination functions. Additionally, the aforementioned system can comprise an IAB capability manager function to coordinate capability messages between the MT and DU functions.

20 Claims, 10 Drawing Sheets

600 generating, by an integrated access backhaul system comprising a processor, device capability data representative of a capability of a first component of the integrated access backhaul system

602 in response to an initial access procedure of the integrated access backhaul system being determined to have been performed, generating, by the integrated access backhaul system, a message comprising the device capability data

604 sending, by the integrated access backhaul system, message data representative of the message to a second component of the integrated access backhaul system to inform the second component of the capability of the first component

FACILITATION OF CAPABILITY CONFIGURATION AND COORDINATION FOR INTEGRATED ACCESS AND BACKHAUL 5G OR OTHER NEXT GENERATION NETWORK

TECHNICAL FIELD

This disclosure relates generally to facilitating capability coordination. For example, this disclosure relates to facilitating capability coordination between a mobile termination function and a distributed unit function for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating capability coordination is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
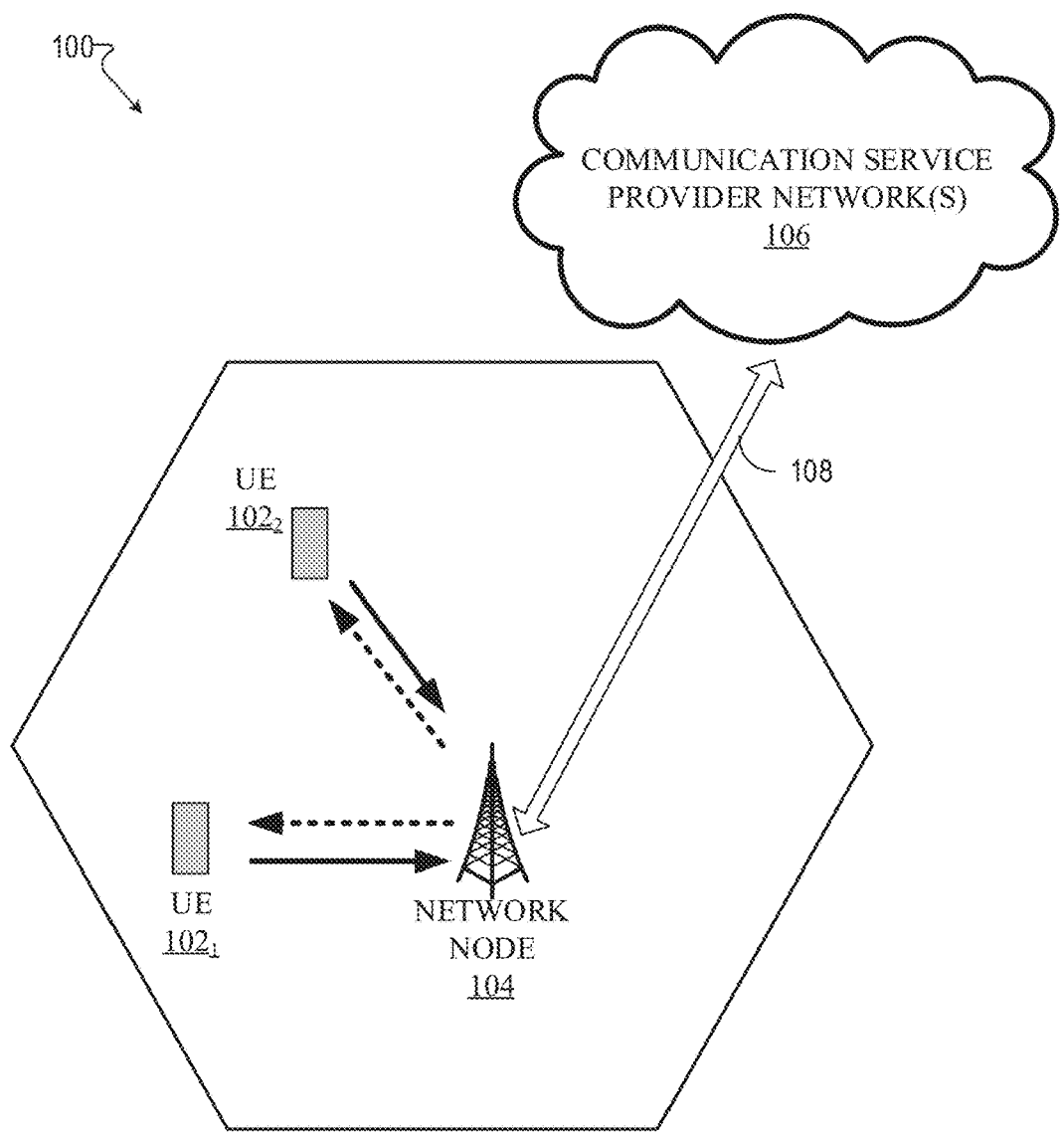
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate capability coordination for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate capability coordination for a 5G network. Facilitating capability coordination for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can include the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

As part of the IAB air interface higher layer protocols, in order to route the relay data traffic within the IAB node, in one example an adaptation layer can be inserted above the RLC of both the MT and DU functions of the IAB node. In addition to data routing, the IAB node can manage the control plane signaling and configurations for both the MT and DU functions. An example of control plan signaling for the MT function involves radio resource control (RRC) and the F1-AP interface and operations, administration and maintenance (OAM) for the DU function. This coordination can be performed internally in the IAB node by an IAB control (IAB-C) interface. As part of the IAB air interface physical layer, the IAB nodes can multiplex the access and backhaul links in time, frequency, or space (e.g., beam-based operation), which can include the transmission of signals/channels utilized as part of initial access and measurements used for radio resource management. The same physical layer signals and channels used for these purposes by access UEs can be reused for performing similar procedures at the IAB node.

Both the higher layer and physical layer functionality may vary depending on IAB node implementation. For example, certain IAB nodes designed for wide-area coverage may have advanced backhaul processing capability but limited topology adaptation functionality since the links are typically line-of-sight. However, other IAB nodes may be designed for local-area or indoor deployments and have reduced backhaul processing capabilities, but advanced topology management functionality, since network planning may be limited and non-line-of-sight deployment may be implicated. Further, the capabilities may be split between the MT and DU functions. As a result, it is desirable for the network to understand and coordinate the capabilities of different IAB nodes in order to enable inter-operability and optimized performance of the access and backhaul links. In order to support IAB network functionality, such as topology formation/adaptation and access and backhaul link management, capability signaling can be configured and exchanged between the network, parent IAB nodes, and child IAB nodes. This can include messages related to the IAB-node DU function capabilities, IAB-node MT function capabilities, and joint IAB-node DU/MT capabilities as well as internal IAB node and network capability management and coordination functions.

To facilitate a wireless link between the network and device, one or more device capabilities can be indicated to the network by higher layer signaling after initial access is performed and before normal data/control traffic between the device and network is initiated. The capabilities can comprise a list of one or more air interface functionalities including support for different protocol stack sub-layers (e.g. PDCP/RLC/MAC), user-plane functionality (e.g., number of data bearers), control-plane functionality (e.g. support for single vs. dual-connectivity), radio resource management functionality (e.g. support for SSB and/or CSI-RS based measurement and reports), and/or physical layer functionality (e.g. waveform, numerology, MIMO layers, and mini-slot support).

In one embodiment, the capability messages can be split into multiple "feature groups," where each feature group comprises one or more functions used for basic or advanced operation of a complete feature of the air interface. In the case of IAB nodes, some features and the corresponding capability functions for the access links can be the same as for user devices (e.g., initial access, L2 function sublayers, physical layer waveform, etc.) and the same capability messages can be reused for user devices and IAB nodes. However, since the IAB nodes support both access and backhaul links, different capability messages can be defined to support configuration and indication of feature groups related to backhaul link operation. The following examples of backhaul-link specific capabilities are listed as follows: backhaul adaptation protocol (BAP) to support DL/UL traffic routing between IAB nodes; backhaul link radio link management (RLM) and radio link failure (RLF) notification; radio resource management functions for backhaul links: re-establishment, handover, MCG/SCG selection/addition/removal, RRC connected/IDLE/Inactive states, and SSB transmission/measurement configurations; different topologies including single/multi-connectivity and mesh/non-mesh topologies; control-plane and user-plane separation for access and backhaul link connectivity; different modes of access and backhaul link multiplexing including time-division multiplexing (TDM), frequency-division multiplexing (FDM), spatial-division multiplexing (SDM), and single and multi-panel full-duplex; in-band or out-of-band operation for different combinations of bands/component carriers; over-the-air timing alignment between parent and child IAB nodes; dynamic utilization of soft resources; backhaul-specific slot formats and TDD resource configuration patterns; and/or backhaul-link power control.

Different IAB node features provided can apply independently to IAB-node MT or IAB-node DU sub-functions of a given IAB node. For example, the SSB transmission configuration (STC) capability is relevant for the IAB-node DU since the IAB-node MT is not involved in the transmission of synchronization signals. Likewise, the SSB measurement timing configuration (SMTC) capability applies to the IAB-node MT function since it is the IAB-node MT, which performs the RRM procedures that equivalently performed by access UEs.

In another embodiment, the IAB node capabilities can be split into function-specific capability messages (e.g., DU-specific or MT-specific). This is beneficial since it enables the network management functions for either the DU or MT of an IAB node to only process and understand the capability messages of the respective IAB-node sub-function. Thus, independent messages over different protocols/interfaces can be used for exchanging the function-specific capability messages. The DU-specific messages can be sent over F1-AP signaling, while MT-specific messages can be sent over RRC signaling.

In another example, the capability message can comprise a native message, which lists the features corresponding to one IAB-node sub-function and a container message, which lists the capabilities corresponding to the other sub-function. A single protocol/interface (e.g., RRC or F1-AP) corresponding to one of the sub-functions can be used for carrying the capability message, and tunneling the capability message of the other sub-function. If the MT function sends the capability message, RRC can be used for indicating the native capabilities corresponding to the MT-related features, while the DU-related features can be listed in a F1-AP message encapsulated in the RRC signaling. If the DU function sends the capability message, F1-AP can be used for indicating the native capabilities corresponding to the DU-related features, while the MT-related features can be listed in an RRC message encapsulated in the F1-AP signaling. An advantage of this approach is that it allows joint indication of the IAB node DU and MT capability messages, reducing signaling overhead while keeping network implementation relatively simple since the network function processing the MT capabilities can read the RRC message and pass the container with the F1-AP message directly to the network function processing the DU capabilities without needing to directly process the F1-AP signaling or understand the DU capabilities.

In another embodiment, a single message and signaling protocol (e.g., RRC or F1-AP) can be used to convey both the DU-specific and MT-specific capabilities. However, it is still beneficial for the network to differentiate the features depending on the relevant sub-function. In this case, the capability message can include a parameter indicating whether the feature corresponds to the IAB-node's DU or MT function. In one example, this parameter can include a list of the feature groups corresponding to each sub-function. In another example the parameter can be provided separately for each feature group. In yet another example, the presence or absence of the parameter for a given feature group can be used to implicitly indicate whether the feature corresponds to the DU function or MT function.

In addition to IAB node function-specific features, other features may be joint features which impact both the IAB node DU and MT functions. In this case, supporting and implementing these features on only one of the IAB node sub-functions can lead to either improper or very sub-optimal IAB node operation. Examples of joint features include implementation of the backhaul adaptation protocol (BAP) routing sublayer, support for different access and backhaul link multiplexing mode (e.g., TDM/FDM/SDM/Full-Duplex), and/or dynamic utilization of network-configured soft and flexible resources.

In another embodiment, the indication of joint DU/MT feature capabilities can be performed using independent messages for the DU and MT components comprising the joint feature using one of the signaling methods described previously. However, additional internal and external IAB node capability coordination can ensure that the capabilities are configured appropriately for both the DU and MT functions; and the network capability management functions can have a common understanding of the joint feature support in order to decide whether to operate according to the joint feature capability, or not, based on the indication.

In one embodiment, described herein is a method comprising generating, by an integrated access backhaul system comprising a processor, device capability data representative of a capability of a first component of the integrated access backhaul system. In response to an initial access procedure of the integrated access backhaul system being determined to have been performed, the method can comprise generating, by the integrated access backhaul system, a message comprising the device capability data. Additionally, the method can comprise sending, by the integrated access backhaul system, message data representative of the message to a second component of the integrated access backhaul system to inform the second component of the capability of the first component.

According to another embodiment, a system can facilitate, receiving component capability data representative of a capability of a first component of an integrated access backhaul device. In response to an initial access procedure of the integrated access backhaul device being determined to have been performed, the system can comprise generating message data representative of a message comprising the component capability data. Furthermore, in response to the generating, the system can comprise sending the message data to a second component of the integrated access backhaul device to inform the second component of the capability of the first component.

According to yet another embodiment, described herein is a machine-readable storage medium that can perform the operations comprising receiving first capability data representative of a first capability of a mobile termination function of network equipment configured to perform an integrated access backhaul function. The machine-readable medium can perform the operations comprising receiving second capability data representative of a second capability of a distributed unit of the network equipment. In response to an initial access procedure of the integrated access backhaul function being determined to have been performed, the machine-readable medium can perform the operations comprising generating message data representative of a message comprising the first capability data. Furthermore, in response to the generating, the machine-readable medium can perform the operations comprising sending the message data to the distributed unit to inform the distributed unit of the first capability of the mobile termination function.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
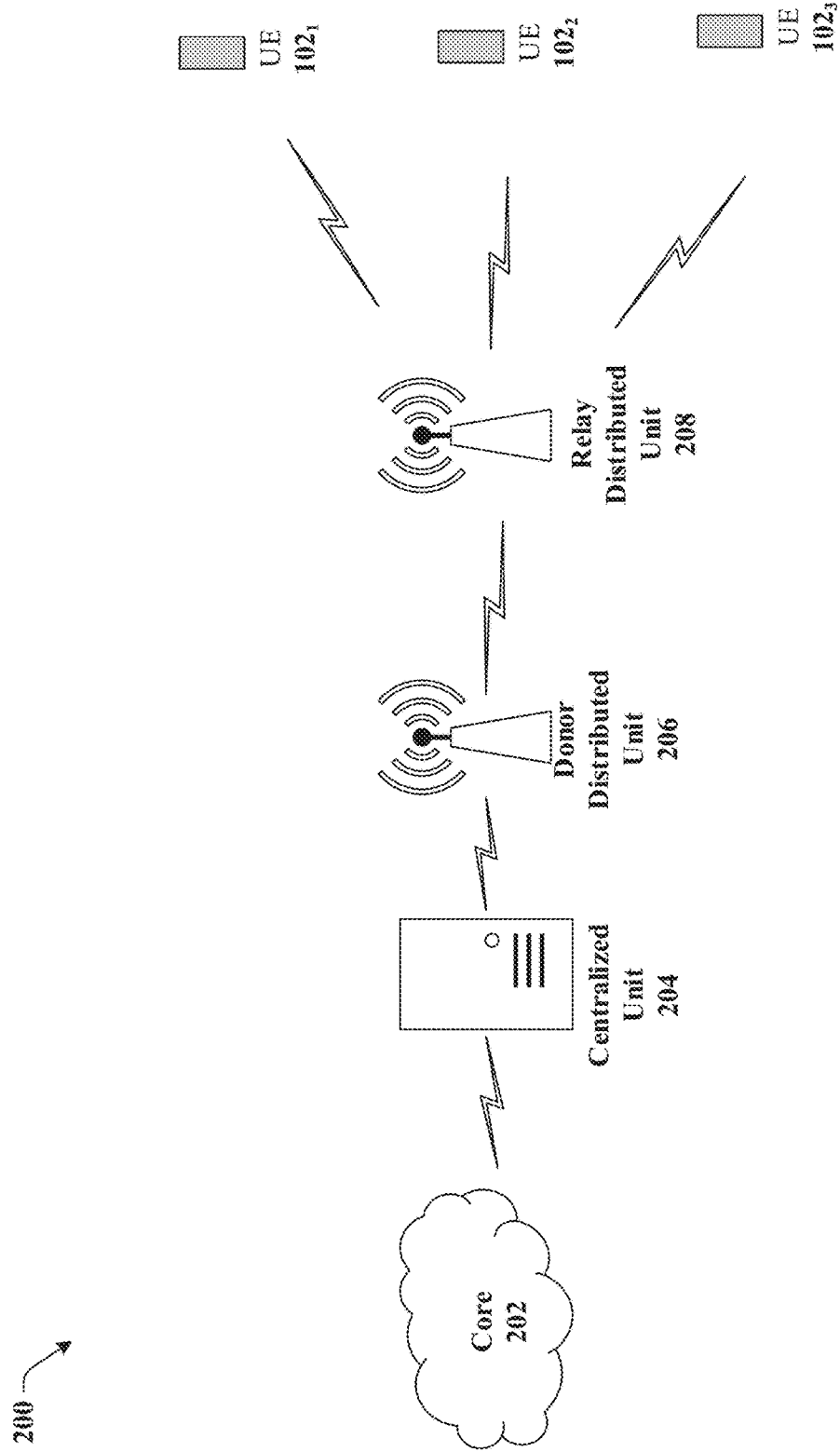
FIG. 2 illustrates an example schematic system block diagram of integrated access and backhaul links according to one or more embodiments

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs 1021, 1022, 1023. The donor distributed unit 206 (e.g., access point) can have a wired backhaul with a protocol stack and can relay the user traffic for the UEs 1021, 1022, 1023 across the IAB and backhaul link. Then the relay distributed unit 208 can take the backhaul link and convert it into different strains for the connected UEs 1021, 1022, 1023. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the RLC, the MAC, and the PHY can be co-located with the base station wherein the system can comprise an F1 interface. In order to add relaying, the F1 interface can be wireless so that the same structure of the donor distributed unit 206 can be kept.

Figure 3:
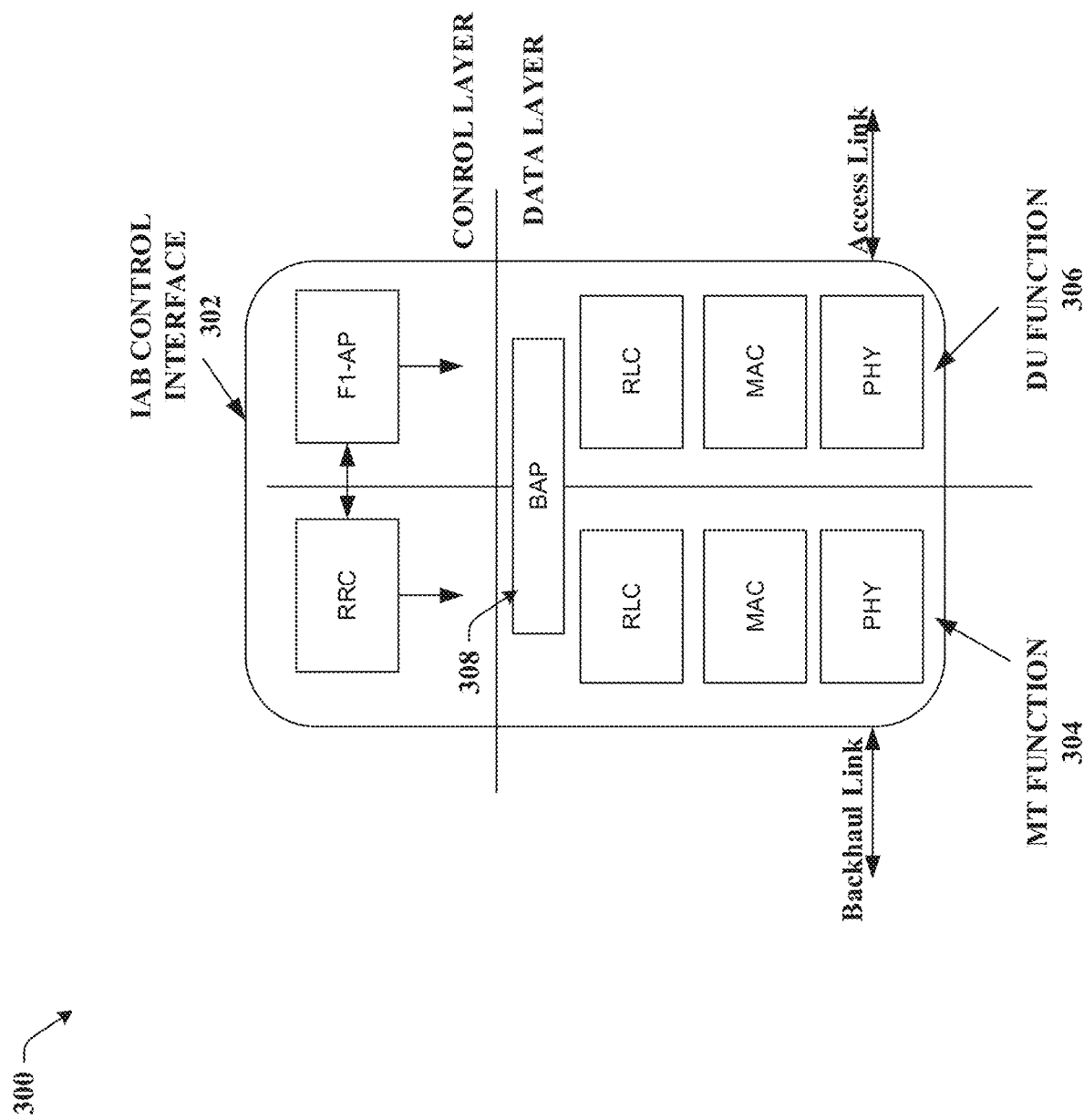
FIG. 3 illustrates an example schematic system block diagram of an integrated access and backhaul node protocol stack according to one or more embodiments.

Referring now to FIG. 3 illustrated is an example schematic system block diagram of an integrated access backhaul (IAB) node 300 protocol stack according to one or more embodiments. If the backhaul links carrying relay traffic are based on the same channels and protocols as the access links carrying user data traffic, then it is possible to construct the IAB node as containing two parallel protocol stacks, one containing a UE function 304 or also called a mobile termination (MT) function which can provide connectivity between the IAB node and a lower order IAB node or donor node which has a wired connection to the core network. The other IAB node functionality is the gNB function or distributed unit (DU) function 306, which can provide connectivity between the IAB node and a higher order IAB node or access UEs.

The IAB node 300 can receive backhaul in the same manner that a UE receives and processes relay links. For example, the data traffic from the UE function 304 can transition up to the BAP layer 308 and then transition down to the DU function 306 of the IAB node 300. From there the data can be sent to another user or to another backhaul node if there are additional hops. With reference to FIG. 2, The IAB node 300 protocol stack can be between the donor distributed unit 206 and the relay distributed unit 208. An IAB control interference 302 can be introduced because the UE function 304 can be configured by the network and typically uses RRC signaling to for the configuration. However, the DU function 306 (relay distributed unit 208) can be controlled by the F1-AP. Thus, a separate protocol stack can be leveraged for the DU function 306 and the IAB BAP layer 308 can connect the UE function 304 to the DU function 306 to can coordinate radio resources.

Figure 4:
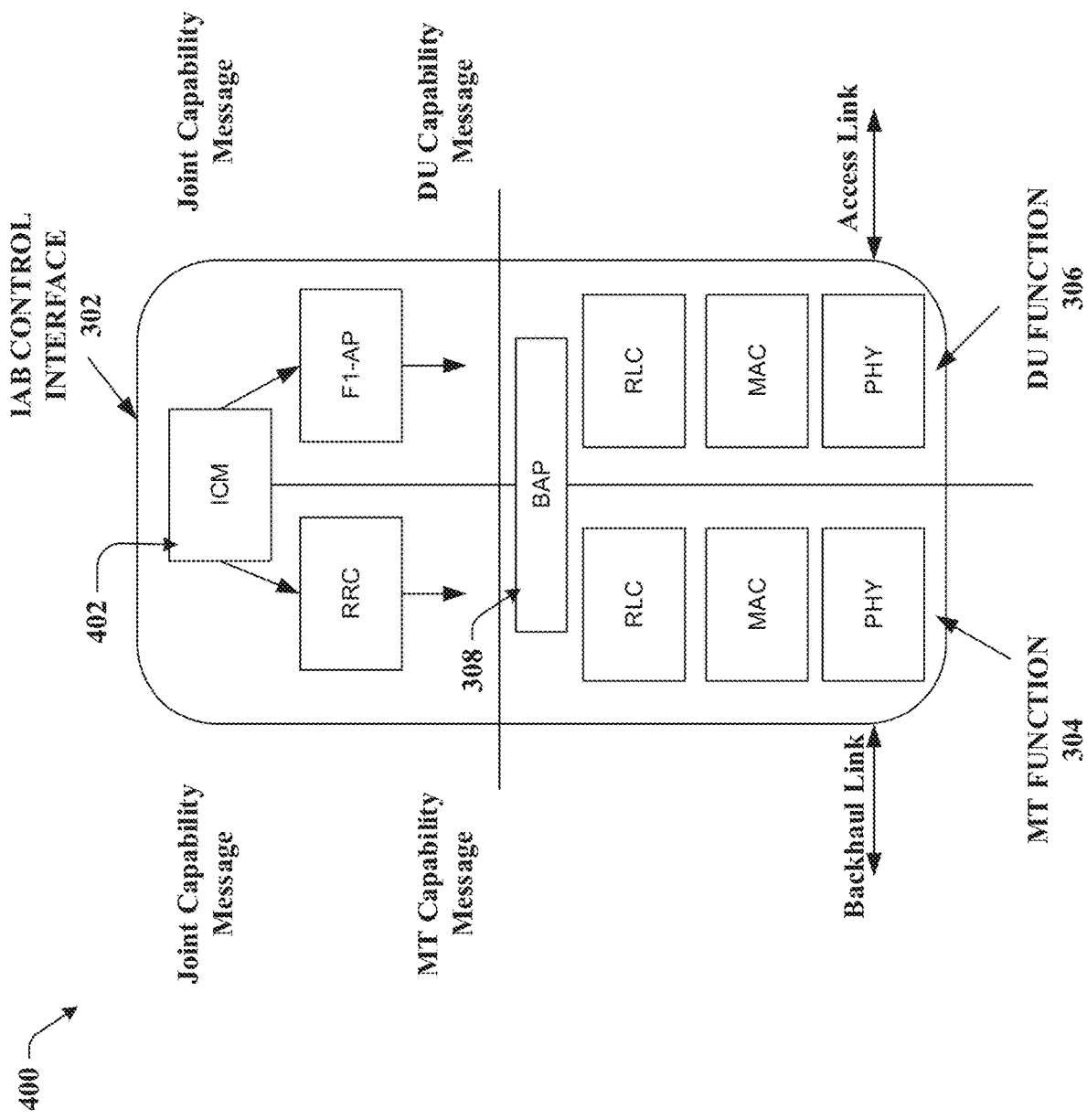
FIG. 4 illustrates an example schematic system block diagram of an integrated access and backhaul node protocol stack comprising a capability manager according to one or more embodiments.

Referring now to FIG. 4, illustrated is an example schematic system block diagram of an integrated access backhaul node protocol stack comprising a capability manager according to one or more embodiments. The IAB capability manager (ICM) can generate a joint capability message, which can be pre-programmed based on the IAB node 300 class or type (e.g., wide-area/local-area, macro/pico, etc.), or it can set the joint capabilities based on a network controller or management function (e.g., OAM, RIC, ONAP, or other SDN controller) and then pass a joint capability message to the MT and DU functions. The MT and DU functions can process the joint capability message and can generate individual capability messages (or a single message with sub-function flags or containers as described previously), which can then be communicated to the network via RRC or F1-AP signaling respectively.

In one embodiment, a network ICM can be implemented to process the capabilities for the IAB node 300, DU and MT functions and ensure that the capability messages for the joint features are aligned and begin operation based on the indication. The network ICM can also send messages to the IAB node 300 and its sub-functions to reconfigure the capability messages to align based on the desired network implementation. In another embodiment, if the DU function 306 indicates support for joint feature X (e.g., non-TDM multiplexing) and the MT function 304 indicates joint feature X is not supported, the network ICM can receive both the RRC and F1-AP messages and determine that this is an error case. It can either send a reconfiguration message to the DU function 306 to indicate that joint feature X should not be supported, or send a message to the MT and/or DU function 306 requesting to indicate to the IAB node's 300 ICM function that non-aligned capability messages have been received and request a retransmission of the individual messages (e.g., either both indicating support of joint feature X or both indicating that joint feature X is not supported).

Figure 5:
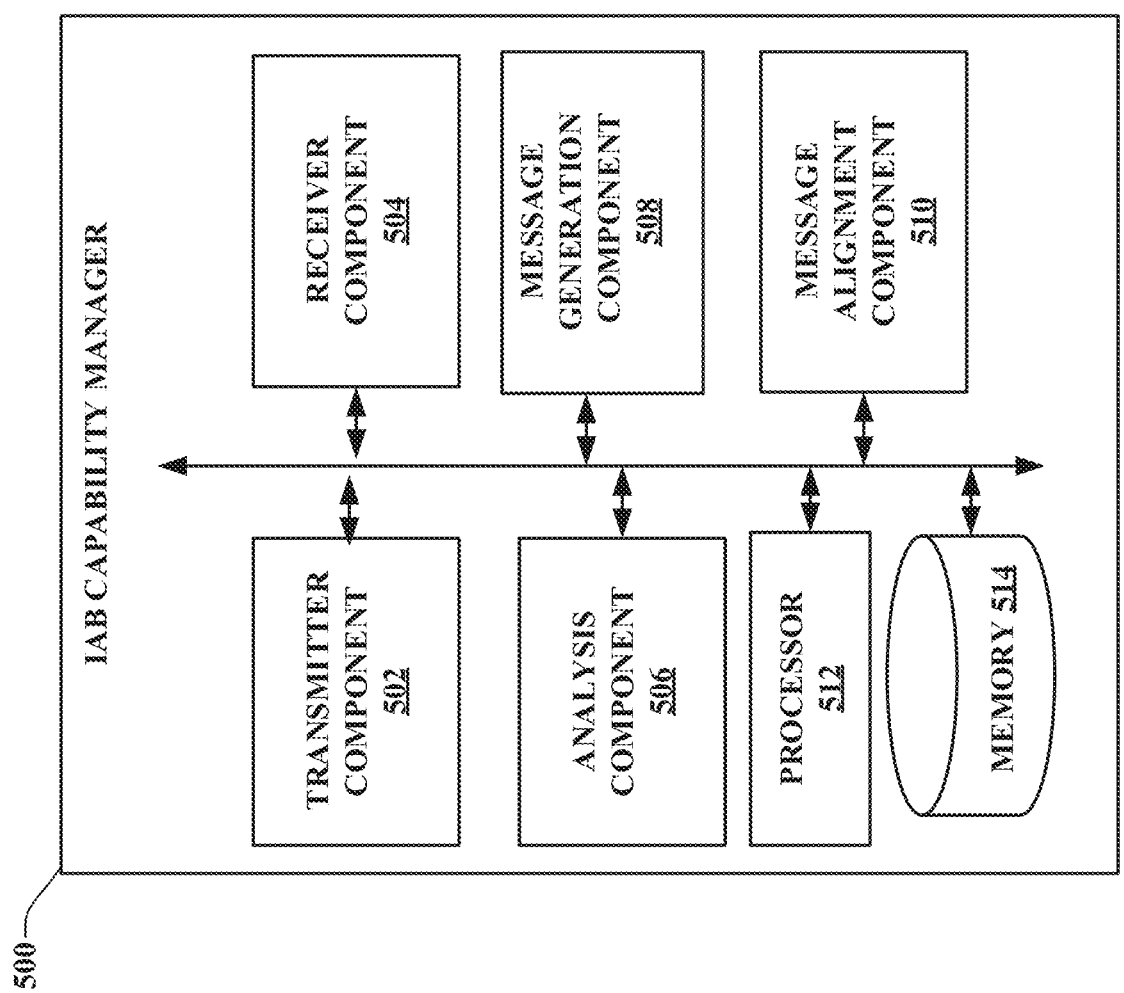
FIG. 5 illustrates an example schematic system block diagram of an integrated and access backhaul capability manager according to one or more embodiments.

Referring now to FIG. 5 illustrates an example schematic system block diagram of an IAB capability manager (ICM) 500. Repetitive description of like elements employed in other embodiments described herein is omitted for sake of brevity.

In the embodiment shown in FIG. 5, the ICM 500 can comprise a transmitter component 502 and a receiver component 504 that can transmit and receive, respectively, capability messages to/from the MT function and/or the DU function. The ICM 500 can also comprise an analysis component 506, a message generation component 508, and a message alignment component 510. It should be noted that any of the aforementioned components or their sub-components, processor 512, and memory 514 can bi-directionally communicate with each other. It should also be noted that in alternative embodiments that other components including, but not limited to the sub-components, processor 512, and/or memory 514, can be external to the ICM 500, as shown in FIG. 5.

Aspects of the processor 512 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the ICM 500. In an aspect, the ICM 500 can also include memory 514 that stores computer executable components and instructions.

The analysis component 506 can analyze the messages received from the MT function and the DU function. The analysis component 506 can determine if there is a conflict between the messages received from the MT function and the DU function. For example, if the DU function indicates support for a joint feature X (e.g., non-TDM multiplexing) and the MT function indicates that joint feature X is not supported, then the ICM 500 can receive both the RRC and F1-AP messages, analyze the messages, and determine that this is an error case based on the analysis (e.g., the conflict between the two messages). This data can then be sent to the message alignment component 510. The message alignment component can ensure that the capability messages for the joint features are aligned and begin operation based on an indication that the messages are aligned. Additionally, the message alignment component 510 can send the messages to the IAB node and its sub-functions to reconfigure the capability messages so that the capability messages are aligned based on the desired network implementation.

Figure 6:
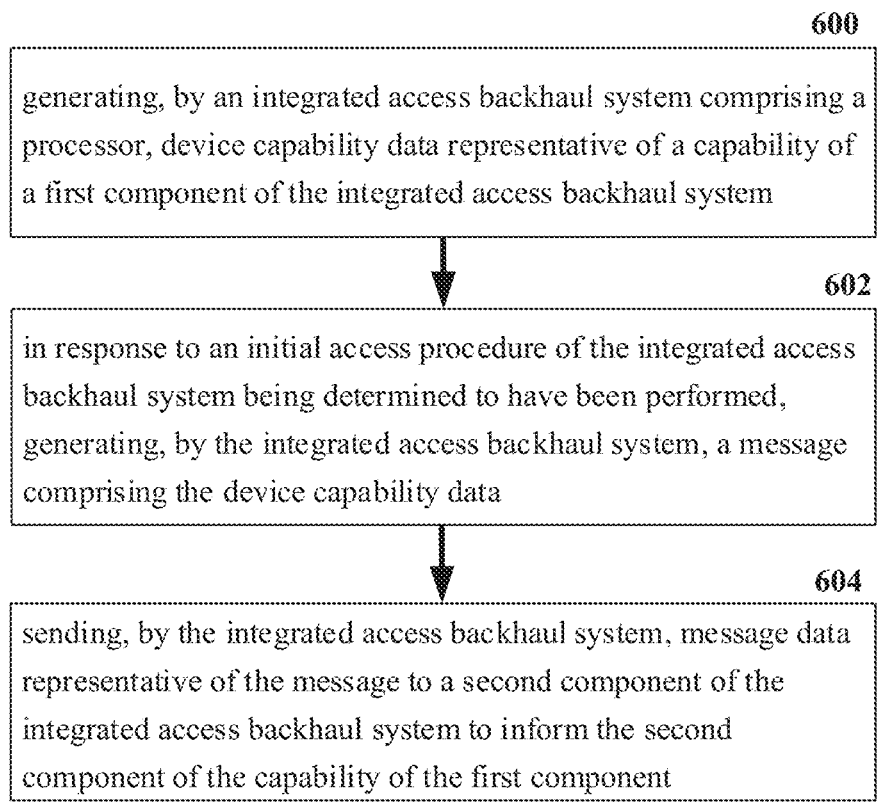
FIG. 6 illustrates an example flow diagram for a method for capability coordination for a 5G network according to one or more embodiments.

Referring now to FIG. 6, illustrated is an example flow diagram for a method for capability coordination for a 5G network according to one or more embodiments. At element 600, the method can comprise generating, by an integrated access backhaul system comprising a processor, device capability data representative of a capability of a first component of the integrated access backhaul system. At element 602, in response to an initial access procedure of the integrated access backhaul system being determined to have been performed, the method can comprise generating, by the integrated access backhaul system, a message comprising the device capability data. Additionally, at element 604, the method can comprise sending, by the integrated access backhaul system, message data representative of the message to a second component of the integrated access backhaul system to inform the second component of the capability of the first component.

Figure 7:
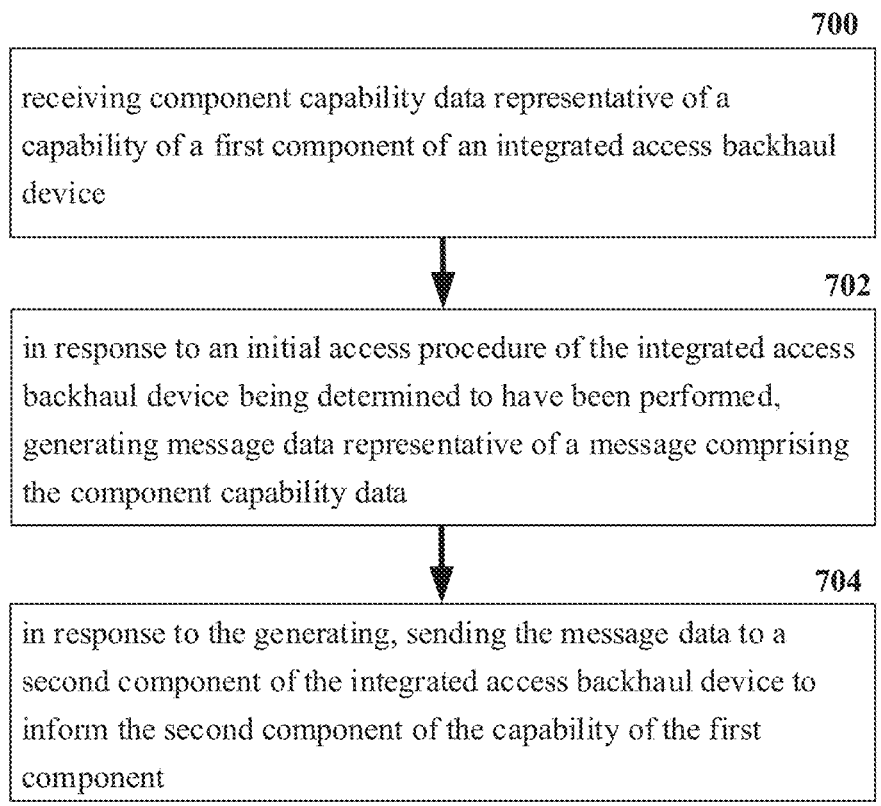
FIG. 7 illustrates an example flow diagram for a system for capability coordination for a 5G network according to one or more embodiments.

Referring now to FIG. 7, illustrated is an example flow diagram for a system for capability coordination for a 5G network according to one or more embodiments. At element 700, the system can facilitate, receiving component capability data representative of a capability of a first component of an integrated access backhaul device. In response to an initial access procedure of the integrated access backhaul device being determined to have been performed, at element 702, the system can comprise generating message data representative of a message comprising the component capability data. Furthermore, at element 704, in response to the generating, the system can comprise sending the message data to a second component of the integrated access backhaul device to inform the second component of the capability of the first component.

Figure 8:
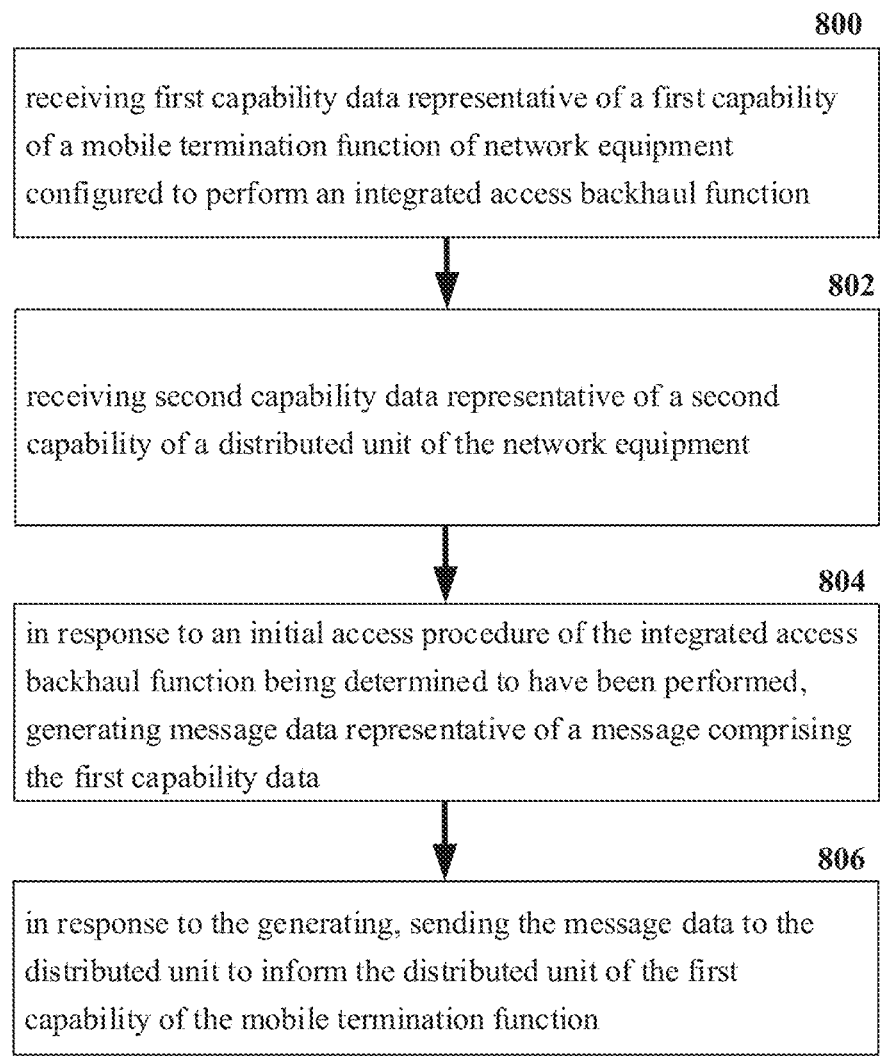
FIG. 8 illustrates an example flow diagram for a machine-readable medium for capability coordination for a 5G network according to one or more embodiments.

Referring now to FIG. 8, illustrated is an example flow diagram for a machine-readable medium for capability coordination for a 5G network according to one or more embodiments. At element 800, the machine-readable storage medium that can perform the operations comprising receiving first capability data representative of a first capability of a mobile termination function of network equipment configured to perform an integrated access backhaul function. At element 802, the machine-readable medium can perform the operations comprising receiving second capability data representative of a second capability of a distributed unit of the network equipment. In response to an initial access procedure of the integrated access backhaul function being determined to have been performed, at element 804, the machine-readable medium can perform the operations comprising generating message data representative of a message comprising the first capability data. Furthermore, in response to the generating, at element 806, the machine-readable medium can perform the operations comprising sending the message data to the distributed unit to inform the distributed unit of the first capability of the mobile termination function.

Figure 9:
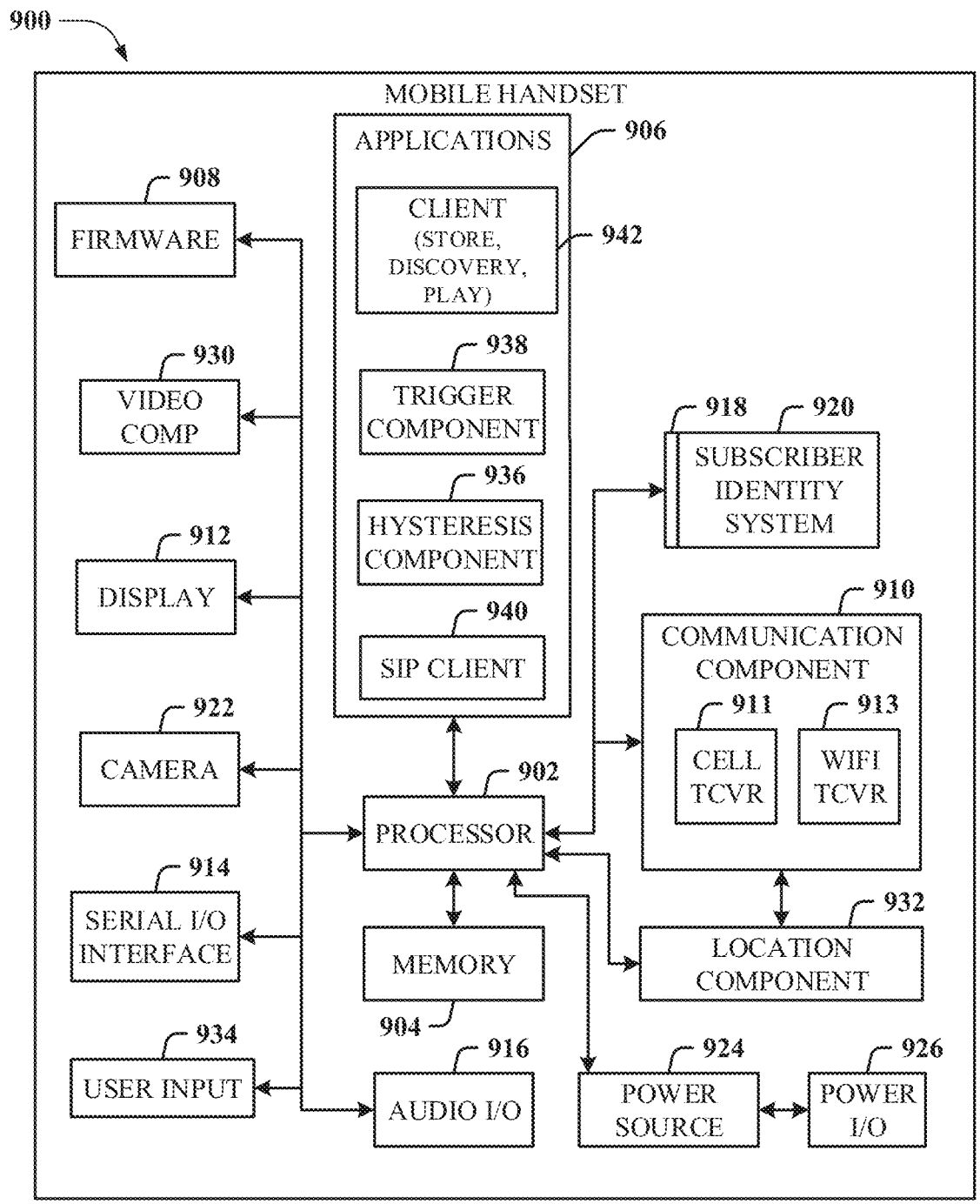
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
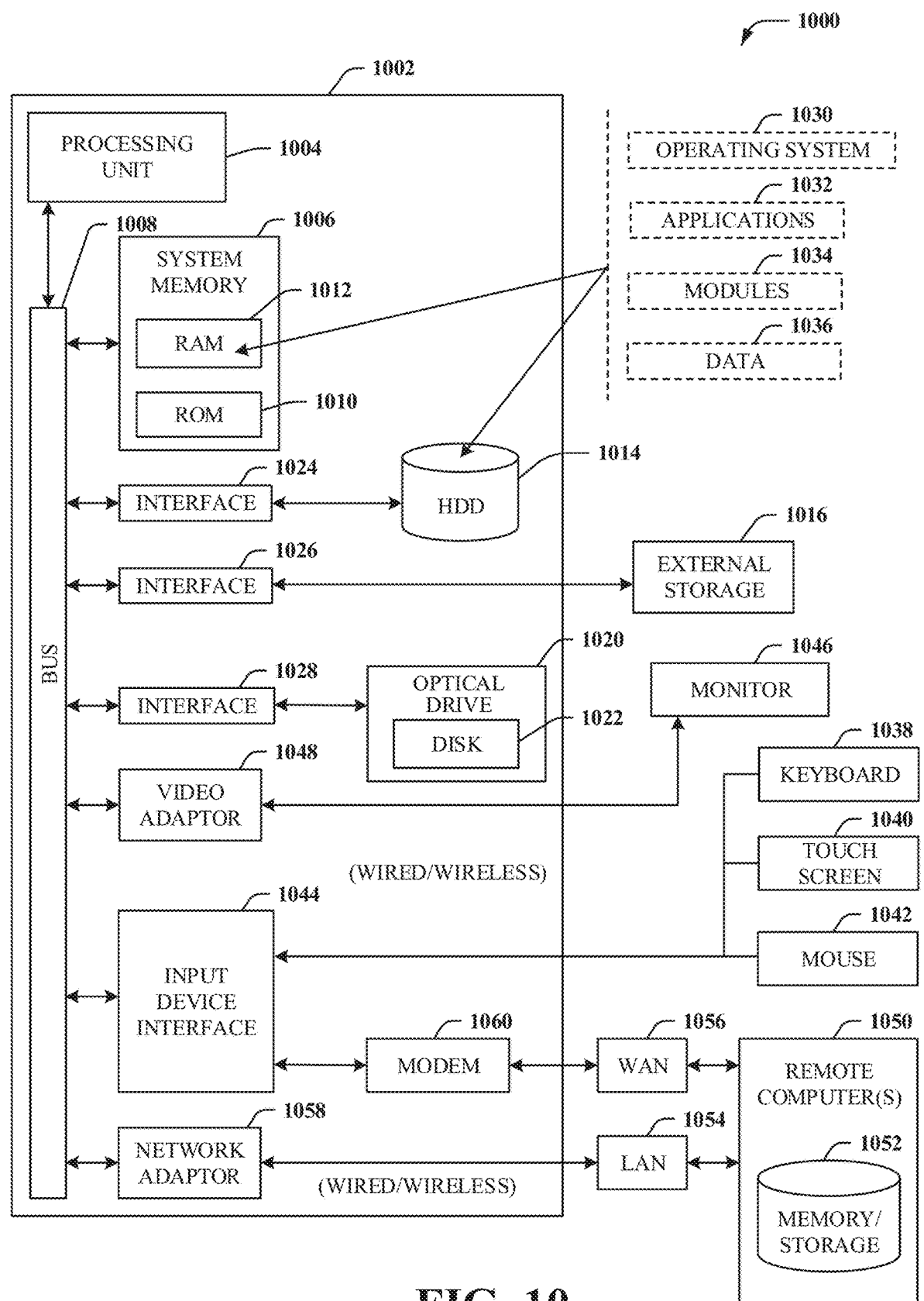
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    generating, by an integrated access backhaul system comprising a processor, device capability data representative of a capability of a first component of the integrated access backhaul system;
    in response to an initial access procedure of the integrated access backhaul system being determined to have been performed, generating, by the integrated access backhaul system, a message comprising the device capability data; and
    sending, by the integrated access backhaul system, message data representative of the message to a second component of the integrated access backhaul system to inform the second component of the capability of the first component.

2. The method of claim 1, wherein the first component is able to perform a mobile termination functionality.

3. The method of claim 2, wherein the second component is able to perform a distributed unit functionality.

4. The method of claim 1, wherein the capability of the first component is a joint capability associated with the first component and the second component.

5. The method of claim 1, wherein the message is sent via a radio resource control signal to inform the second component, and wherein the capability is associated with a distributed unit functionality.

6. The method of claim 1, wherein the message is sent via an F1 application protocol to inform the second component, and wherein the capability is associated with a mobile termination functionality.

7. The method of claim 1, further comprising:
    implementing, by the integrated access backhaul system, a backhaul adaptation protocol routing sublayer associated with a joint feature of the first component and the second component.

8. A system, comprising:
    a processor; and
    a memory that stores executable instructions that, when executed by the processor, facilitate performance of operations, comprising:
        receiving component capability data representative of a capability of a first component of an integrated access backhaul device;
        in response to an initial access procedure of the integrated access backhaul device being determined to have been performed, generating message data representative of a message comprising the component capability data; and
        in response to the generating, sending the message data to a second component of the integrated access backhaul device to inform the second component of the capability of the first component.

9. The system of claim 8, wherein the component capability data is first component capability data, wherein the capability is a first capability, and wherein the operations further comprise:
    receiving second component capability data representative of a second capability, different than the first capability, of the second component.

10. The system of claim 8, wherein the component capability data is first component capability data, wherein the capability is a first capability, and wherein the operations further comprise:
    receiving second component capability data representative of a second capability of the second component, wherein the first capability and the second capability are a same capability.

11. The system of claim 8, wherein the first component comprises a mobile termination functionality of a mobile termination function.

12. The system of claim 11, wherein the second component comprises a distributed unit function of a distributed unit.

13. The system of claim 8, wherein the operations further comprise:
    splitting the capability between the first component and the second component, resulting in a split capability.

14. The system of claim 13, wherein the split capability comprises a mobile termination function capability split from a distributed unit capability.

15. A non-transitory machine-readable medium, comprising executable instructions that, when executed by a processor, facilitate performance of operations, comprising:
receiving first capability data representative of a first capability of a mobile termination function of network equipment configured to perform an integrated access backhaul function;
receiving second capability data representative of a second capability of a distributed unit of the network equipment;
in response to an initial access procedure of the integrated access backhaul function being determined to have been performed, generating message data representative of a message comprising the first capability data; and
in response to the generating, sending the message data to the distributed unit to inform the distributed unit of the first capability of the mobile termination function.

16. The non-transitory machine-readable medium of claim 15, wherein the operations further comprise:
receiving the first capability data via a radio resource control message associated with the mobile termination function.

17. The non-transitory machine-readable medium of claim 16, wherein the operations further comprise:
sending the first capability data via an F1 application protocol message associated with the distributed unit.

18. The non-transitory machine-readable medium of claim 15, wherein the first capability comprises a control plane functionality.

19. The non-transitory machine-readable medium of claim 15, wherein the first capability comprises a user plane functionality.

20. The non-transitory machine-readable medium of claim 15, wherein the first capability comprises a physical layer functionality.

* * * * *